United States Patent
Feigel (10) Patent No.: US 12,109,991 B2
(45) Date of Patent: Oct. 8, 2024

(54) ELECTRONIC BRAKE SYSTEM

(71) Applicant: HL MANDO CORPORATION, Gyeonggi-do (KR)

(72) Inventor: Hans Joerg Feigel, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 17/551,118

(22) Filed: Dec. 14, 2021

(65) Prior Publication Data

US 2022/0105907 A1 Apr. 7, 2022

Related U.S. Application Data

(63) Continuation of application No. 15/981,896, filed on May 17, 2018, now abandoned.

(30) Foreign Application Priority Data

May 17, 2017 (KR) .......................... 10-2017-0061149

(51) Int. Cl.
*B60T 7/04* (2006.01)
*B60T 8/40* (2006.01)
(Continued)

(52) U.S. Cl.
CPC ............ *B60T 7/042* (2013.01); *B60T 8/4081* (2013.01); *B60T 13/148* (2013.01);
(Continued)

(58) Field of Classification Search
CPC . B60T 7/04; B60T 7/042; B60T 8/171; B60T 8/4081; B60T 8/409; B60T 8/341;
(Continued)

(56) References Cited

U.S. PATENT DOCUMENTS 5,952,799 A * 9/1999 Maisch .................. B60T 8/321
          318/16
6,050,653 A    4/2000 Wachi et al.
(Continued)

FOREIGN PATENT DOCUMENTS

CN      1994793       7/2007
CN    101032957       9/2007
(Continued)

OTHER PUBLICATIONS

Machine translation, EP 2977282 A1. (Year: 2016).*
(Continued)

*Primary Examiner* — Thomas J Williams
(74) *Attorney, Agent, or Firm* — Womble Bond Dickinson (US) LLP (57) ABSTRACT

An electronic brake system is disclosed. The electronic brake system includes a pedal operation part connected to a brake pedal so as to provide better pedal feel to a driver of a vehicle; a first hydraulic circuit which includes two wheel brakes, a first hydraulic pressure supply part generating hydraulic pressure, and a plurality of valves, and is hydraulically connected to the pedal operation part; a second hydraulic circuit which includes the other two wheel brakes, a second hydraulic pressure supply part generating hydraulic pressure, and a plurality of valves, and is hydraulically connected to the pedal operation part; a first electric circuit configured to control the first hydraulic circuit; a second electric circuit configured to control the second hydraulic circuit; and a power-supply source configured to supply power to the first electric circuit and the second electric circuit. The first electric circuit and the second electric circuit are operated independently of each other.

20 Claims, 4 Drawing Sheets

(51) Int. Cl.
    *B60T 13/14*     (2006.01)
    *B60T 13/66*     (2006.01)
    *B60T 13/74*     (2006.01)
    *B60T 8/32*     (2006.01)

(52) U.S. Cl.
    CPC .......... *B60T 13/662* (2013.01); *B60T 13/745* (2013.01); *B60T 8/321* (2013.01); *B60T 2270/404* (2013.01)

(58) Field of Classification Search
    CPC ........ B60T 8/343; B60T 8/344; B60T 13/142; B60T 13/148; B60T 13/662; B60T 13/686; B60T 13/745; B60T 2270/404
    See application file for complete search history.

(56) References Cited

U.S. PATENT DOCUMENTS

| | | | |
|---|---|---|---|
| 6,132,010 | A | 10/2000 | Holt et al. |
| 6,309,032 | B1 | 10/2001 | Kusano et al. |
| 6,410,993 | B1 | 6/2002 | Giers |
| 6,464,306 | B2 | 10/2002 | Shaw et al. |
| 7,219,966 | B2 | 5/2007 | Young |
| 8,424,976 | B2 | 4/2013 | Dinkel et al. |
| 9,002,608 | B2 * | 4/2015 | Crombez .............. B60T 8/4077 303/3 |
| 9,238,453 | B2 | 1/2016 | Uechi et al. |
| 2003/0075978 | A1 | 4/2003 | Riddiford et al. |
| 2005/0017574 | A1 * | 1/2005 | Weiberle .............. B60T 13/741 303/3 |
| 2006/0163942 | A1 * | 7/2006 | Tsunehara .............. B60T 13/66 303/113.5 |
| 2007/0152500 | A1 | 7/2007 | Wakabayashi et al. |
| 2007/0170774 | A1 | 7/2007 | Gerum et al. |
| 2007/0188018 | A1 * | 8/2007 | Reuter .................. B60T 8/4081 303/114.1 |
| 2008/0234909 | A1 * | 9/2008 | Iwasaki .................. B62D 5/065 701/70 |
| 2008/0257670 | A1 | 10/2008 | Drumm et al. |
| 2009/0091180 | A1 | 4/2009 | Iwasaki et al. |
| 2009/0256417 | A1 * | 10/2009 | Ishii ........................ B60T 8/267 303/152 |
| 2011/0160970 | A1 * | 6/2011 | Crombez ................ B60T 8/321 303/3 |
| 2011/0254357 | A1 * | 10/2011 | Vollert .................. B60T 13/586 303/2 |
| 2013/0282249 | A1 | 10/2013 | Heise et al. |
| 2014/0346852 | A1 | 11/2014 | Thrasher |
| 2015/0115698 | A1 * | 4/2015 | Brok ...................... B60T 15/028 303/3 |
| 2015/0203082 | A1 | 7/2015 | Förster et al. |
| 2016/0152219 | A1 | 6/2016 | Besier et al. |
| 2016/0214582 | A1 * | 7/2016 | Brenn .................... B60T 7/042 |
| 2017/0072920 | A1 * | 3/2017 | Besier .................. B60T 8/4081 |
| 2018/0334149 | A1 | 11/2018 | Feigel |
| 2022/0105907 | A1 * | 4/2022 | Feigel .................... B60T 7/042 |
| 2022/0274576 | A1 * | 9/2022 | Ganzel .................. B60T 13/588 |

FOREIGN PATENT DOCUMENTS

| | | | |
|---|---|---|---|
| CN | 102256839 | | 11/2011 |
| CN | 103167976 | | 6/2013 |
| CN | 104768813 | | 7/2015 |
| CN | 105745126 | | 7/2016 |
| CN | 106585599 | | 4/2017 |
| DE | 198 07 366 | | 8/1999 |
| DE | 100 36 287 | | 2/2002 |
| DE | 10319194 | | 9/2004 |
| DE | 10036286 | B4 * | 7/2009 ............ B60T 13/662 |
| DE | 10 2012 210 809 | | 1/2013 |
| DE | 102012020421 | A1 * | 4/2014 ............ B60T 13/146 |
| DE | 10 2013 224 870 | | 9/2014 |
| DE | 10 2013 223 859 | | 5/2015 |
| DE | 102013224783 | A1 * | 6/2015 |
| DE | 10 2014 225 962 | | 6/2016 |
| DE | 102014225958 | A1 * | 6/2016 ............. B60T 13/14 |
| DE | 102017003650 | A1 * | 10/2018 |
| EP | 2 520 473 | | 11/2012 |
| EP | 2977282 | A1 * | 1/2016 |
| EP | 3670277 | A1 * | 6/2020 |
| JP | 2009-208600 | | 9/2009 |
| WO | 2016/000865 | | 1/2016 |
| WO | WO-2016139186 | A1 * | 9/2016 |
| WO | WO-2018233908 | A1 * | 12/2018 |

OTHER PUBLICATIONS

EPO translation, DE 10 2012 020 421 A1. (Year: 2014).*
Office Action dated Oct. 9, 2019 for Chinese Patent Application No. 201810494809.2 and its English machine translation by Google Translate.
Examiner's Answer to Appeal Brief dated Oct. 14, 2021 for U.S. Appl. No. 15/981,896 (now published as US 2018/0334149).
Pre-Brief Appeal Conference Decision dated Jul. 23, 2021 for U.S. Appl. No. 15/981,896 (now published as US 2018/0334149).
Advisory Action dated Apr. 30, 2021 for U.S. Appl. No. 15/981,896 (now published as US 2018/0334149).
Final Office Action dated Jan. 27, 2021 for U.S. Appl. No. 15/981,896 (now published as US 2018/0334149).
Office Action dated Oct. 1, 2020 for U.S. Appl. No. 15/981,896 (now published as US 2018/0334149).
Office Action dated May 7, 2020 for U.S. Appl. No. 15/981,896 (now published as US 2018/0334149).
Final Office Action dated Jan. 31, 2020 for U.S. Appl. No. 15/981,896 (now published as US 2018/0334149).
Office Action dated Aug. 19, 2019 for U.S. Appl. No. 15/981,896 (now published as US 2018/0334149).
Office Action dated Jun. 8, 2020 for Chinese Patent Application No. 201810494809.2 and its English translation from Global Dossier.
Office Action dated Jan. 4, 2021 for Chinese Patent Application No. 201810494809.2 and its English translation from Global Dossier.
Office Action dated May 7, 2021 for Chinese Patent Application No. 201810494809.2 and its English translation from Global Dossier.
Office Action dated Aug. 30, 2021 for Chinese Patent Application No. 201810494809.2 and its English translation from Global Dossier.
Office Action dated Jul. 13, 2021 for German Patent Application No. 10 2018 207 771.1 and its English machine translation by Google Translate.

* cited by examiner

ELECTRONIC BRAKE SYSTEM

CROSS-REFERENCE TO RELATED APPLICATIONS

This application is a continuation of U.S. patent application Ser. No. 15/981,896 filed on May 17, 2018, which is based on and claims priority under 35 U.S.C. § 119 to Korean Patent Application No. 10-2017-0061149, filed on May 17, 2017 in the Korean Intellectual Property Office, the disclosure of which is incorporated by reference in its entirety.

BACKGROUND

1. Field

Embodiments of the present disclosure relate to an electronic brake system, and more particularly to an electronic brake system for generating a braking force using an electrical signal corresponding to a displacement of a brake pedal.

2. Description of the Related Art

A brake system for braking of a vehicle is essentially mounted to a vehicle, and various systems have recently been proposed to obtain stronger and more stable braking force.

Examples of brake systems include anti-lock brake systems (ABSs) to prevent slippage of wheels during braking, brake traction control systems (BTCSs) to prevent slippage of driving wheels during sudden unintended acceleration from a stop or upon rapid acceleration of a vehicle, and electronic stability control systems (ESCs) to stably maintain a driving state of vehicles by controlling a brake hydraulic pressure through combination of an anti-lock brake (ABS) system with a brake traction control system.

Generally, an electronic brake includes an actuator. Once a driver pushes a brake pedal, the actuator senses displacement of the pedal through a pedal displacement sensor, and receives an electric signal indicating the driver's braking intention from the pedal displacement sensor, such that pressure is supplied to the wheel cylinder.

An electronic brake system provided with such an actuator has been disclosed in European Registered Patent No. EP 2 520 473. According to this European Patent document, the actuator is configured such that a motor is activated according to a pedal effort of a brake pedal to generate braking pressure. At this point, the braking pressure is generated by converting a rotational force of the motor into a rectilinear movement to pressurize a piston.

CITED REFERENCE

Patent Document

European Registered Patent No. EP 2 520 473 A1 (Honda Motor Co., Ltd.), (Nov. 7, 2012)

SUMMARY

Therefore, it is an aspect of the present disclosure to provide an electronic brake system for generating braking force using an actuator, and being efficiently manufactured and driven.

Additional aspects of the invention will be set forth in part in the description which follows and, in part, will be obvious from the description, or may be learned by practice of the invention.

In accordance with an aspect of the present disclosure, an electronic brake system includes a pedal operation part connected to a brake pedal so as to provide better pedal feel to a driver of a vehicle; a first hydraulic circuit which includes two wheel brakes, a first hydraulic pressure supply part generating hydraulic pressure, and a plurality of valves, and is hydraulically connected to the pedal operation part; a second hydraulic circuit which includes other two wheel brakes, a second hydraulic pressure supply part generating hydraulic pressure, and a plurality of valves, and is hydraulically connected to the pedal operation part; a first electric circuit configured to control the first hydraulic circuit; a second electric circuit configured to control the second hydraulic circuit; and a power-supply source configured to supply power to the first electric circuit and the second electric circuit. The first electric circuit and the second electric circuit are operated independently of each other.

The first electric circuit may include a first electronic control unit (ECU), and the second electric circuit may include a second electronic control unit (ECU).

The first hydraulic circuit, the first hydraulic pressure supply part, and the first electronic control unit (ECU) may be integrated into a first module. The second hydraulic circuit, the second hydraulic pressure supply part, and the second electronic control unit (ECU) may be integrated into a second module.

The first hydraulic circuit may further include a first control valve configured to interconnect an inlet port and an outlet port of the first hydraulic pressure supply part. The second hydraulic circuit may further include a second control valve configured to interconnect an inlet port and an outlet port of the second hydraulic pressure supply part.

The electronic brake system may further include a communication interface configured to perform communication between the first electric circuit and the second electric circuit.

The communication interface may be electrically operated independently of the first electric circuit and the second electric circuit.

The first hydraulic circuit may include a first inlet valve and a third inlet valve respectively disposed between the outlet port of the first hydraulic pressure supply part and the two wheel brakes, a first outlet valve and a third outlet valve respectively disposed between the inlet port of the first hydraulic pressure supply part and the two wheel brakes, and a first-circuit hydraulic pressure sensor connected to the first hydraulic pressure supply part. The second hydraulic circuit may include a second inlet valve and a fourth inlet valve respectively disposed between the outlet port of the second hydraulic pressure supply part and the other two wheel brakes, a second outlet valve and a fourth outlet valve respectively disposed between the inlet port of the second hydraulic pressure supply part and the other two wheel brakes, and a second-circuit hydraulic pressure sensor connected to the second hydraulic pressure supply part.

Each of the first hydraulic pressure supply part and the second hydraulic pressure supply part may include a pump unit, and a drive unit configured to drive the pump unit.

The electronic brake system may further include a first reservoir chamber connected to the inlet port of the first hydraulic pressure supply part, and a second reservoir chamber connected to the inlet port of the second hydraulic pressure supply part.

The pedal operation part may include a pedal displacement sensor configured to detect driver's braking intention, and transmit an electric signal indicating the driver's braking intention to at least one of the first electric circuit and the second electric circuit.

The pedal operation part may further include a cylinder chamber and a simulator chamber.

The cylinder chamber may include a first cylinder chamber and a second cylinder chamber. The first cylinder chamber may be connected to the inlet port of the first hydraulic pressure supply part. The second cylinder chamber may be connected to the inlet port of the second hydraulic pressure supply part.

The electronic brake system may further include a reservoir configured to store an operating fluid therein. The simulator chamber may be connected to a simulation part and is connected to the reservoir through a first reservoir valve.

The cylinder chamber may be connected to the reservoir through a second reservoir valve.

The electronic brake system may further include a reservoir configured to store an operating fluid therein. The simulator chamber is connected to the reservoir through a first reservoir valve, and the cylinder chamber is connected to the reservoir through a second reservoir valve. During testing a presence or absence of leakage of air or the operating fluid, the first hydraulic pressure supply part and the second hydraulic pressure supply part are configured to generate hydraulic pressure when the first reservoir valve and the second reservoir valve are closed.

The outlet port of the first hydraulic pressure supply part and the outlet port of the second hydraulic pressure supply part may be connected to each other through a balance valve.

The first hydraulic circuit, the first hydraulic pressure supply part, the first electronic control unit (ECU), the second hydraulic circuit, the second hydraulic pressure supply part, and the second electronic control unit (ECU) may be integrated into a single module.

In accordance with another aspect of the present disclosure, an electronic brake system includes: a pedal operation part connected to a brake pedal so as to provide better pedal feel to a driver of a vehicle; a first hydraulic circuit which includes two wheel brakes, a first hydraulic pressure supply part generating hydraulic pressure, and a plurality of valves, and is hydraulically connected to the pedal operation part; a second hydraulic circuit which includes other two wheel brakes, a second hydraulic pressure supply part generating hydraulic pressure, and a plurality of valves, and is hydraulically connected to the pedal operation part; a first electric circuit configured to control the first hydraulic circuit; a second electric circuit configured to control the second hydraulic circuit; a first power-supply source configured to supply power to the first electric circuit; and a second power-supply source configured to supply power to the second electric circuit. The first electric circuit and the second electric circuit are operated independently of each other, and the first power-supply source and the second power-supply source are operated independently of each other.

The first electric circuit may include a first electronic control unit (ECU). The second electric circuit may include a second electronic control unit (ECU).

The pedal operation part may include a pedal displacement sensor configured to detect driver's braking intention, and transmit an electric signal indicating the driver's braking intention to at least one of the first electric circuit and the second electric circuit.

The pedal displacement sensor may include a first pedal displacement sensor connected to the first power-supply source, and a second pedal displacement sensor connected to the second power-supply source.

The pedal operation part may include a cylinder chamber and a simulator chamber.

The electronic brake system may further include a reservoir configured to store an operating fluid therein. The simulator chamber is connected to a simulation part and is connected to the reservoir through a first reservoir valve. The first reservoir valve is simultaneously connected to the first power-supply source and the second power-supply source.

The cylinder chamber may be connected to the reservoir through a second reservoir valve. The second reservoir valve may be simultaneously connected to the first power-supply source and the second power-supply source.

In accordance with another aspect of the present disclosure, an electronic brake system includes: a pedal operation part connected to a brake pedal so as to provide better pedal feel to a driver of a vehicle; a first hydraulic circuit which includes two wheel brakes, a first hydraulic pressure supply part generating hydraulic pressure, and a plurality of valves, and is hydraulically or mechanically separated from the pedal operation part; a second hydraulic circuit which includes other two wheel brakes, a second hydraulic pressure supply part generating hydraulic pressure, and a plurality of valves, and is hydraulically or mechanically separated from the pedal operation part; a first electric circuit configured to control the first hydraulic circuit; a second electric circuit configured to control the second hydraulic circuit; a first power-supply source configured to supply power to the first electric circuit; and a second power-supply source configured to supply power to the second electric circuit. The first electric circuit and the second electric circuit are operated independently of each other, and the first power-supply source and the second power-supply source are operated independently of each other.

The first electric circuit may include a first electronic control unit (ECU), and the second electric circuit may include a second electronic control unit (ECU).

The first hydraulic circuit, the first hydraulic pressure supply part, and the first electronic control unit (ECU) may be integrated into a first module. The second hydraulic circuit, the second hydraulic pressure supply part, and the second electronic control unit (ECU) may be integrated into a second module.

The electronic brake system may further include a first reservoir chamber connected to an inlet port of the first hydraulic pressure supply part, and a second reservoir chamber connected to an inlet port of the second hydraulic pressure supply part. The first reservoir chamber is installed in the first module, and the second reservoir chamber is installed in the second module.

The pedal operation part may include a piston connected to the brake pedal, a housing configured to form a space in which the piston moves forward and backward, an elastic member configured to provide reaction force corresponding to a pedal effort of the brake pedal, and a pedal spring configured to provide restoring force to the brake pedal.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also the size of the component may be exaggerated or reduced for convenience and clarity of description.

Figure 1:
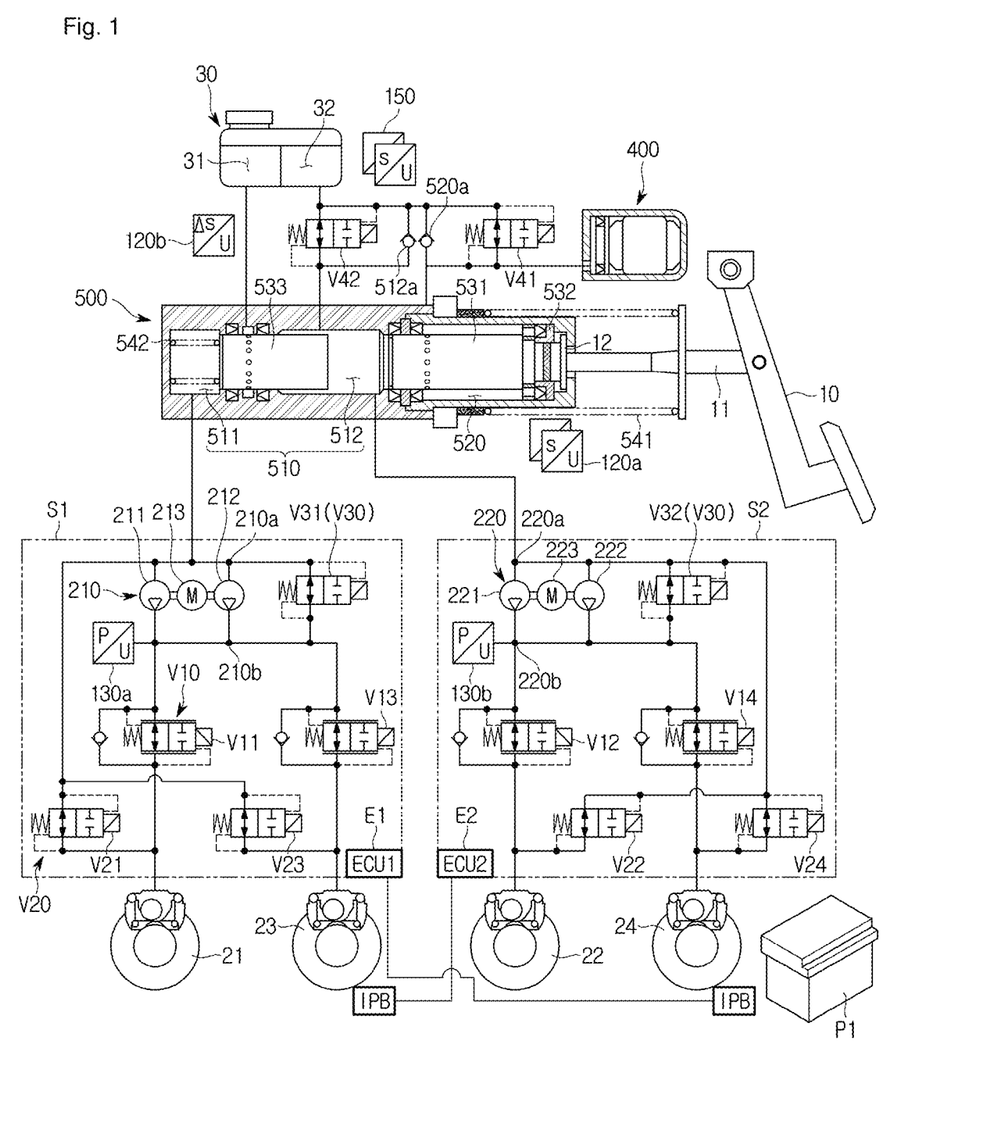
FIG. 1 is a view illustrating an electronic brake system according to a first embodiment of the present disclosure.

FIG. 1 is a view illustrating an electronic brake system according to a first embodiment of the present disclosure. Referring to FIG. 1, the electronic brake system according to the first embodiment may largely include a pedal operation part 500 connected to a pedal 10, a hydraulic pressure supply part 200 having a first hydraulic-pressure supply part 210 and a second hydraulic-pressure supply part 220, an inlet valve V10 and an outlet valve V20 respectively included in a first hydraulic pressure circuit and a second hydraulic circuit, control valves V31 and V32 for interconnecting an inlet port and an outlet port of the hydraulic pressure supply part 200, and a simulator unit 400 connected to the pedal operation part 500 so as to provide better pedal feel to a drive of a vehicle. The pedal 10 may be a means for receiving the driver's braking intention and applying forward force to a first piston 513, and may press a cylinder chamber 510 by pushing the first piston 513 using an input rod 11 connected to the pedal 10. In this case, a stopper projection 12 protruding laterally may be provided to the input rod 11, such that the input rod 11 moving forward may press a second piston 532 through the stopper projection 12.

The pedal 10 is generally used for an electronic brake system, may receive an electrical signal indicating the driver's braking intention from pedal displacement sensors 120a and 120b, and may thus supply pressure to a wheel brake.

The wheel brake 20 may include a caliper to be pressed by an operating fluid, and wheels to be braked by the caliper. The wheel brake unit 20 may be pressed by the operating fluid, and may brake wheels, thereby generating braking force to the vehicle. The wheel brake 20 may include first to fourth wheel brakes 21, 22, 23, and 24. The first to fourth wheel brakes 21, 22, 23, and 24 may include a front left wheel FL, a front right wheel FR, a rear left wheel RL, and a rear right wheel RR.

A reservoir 30 may store the operating fluid therein, and may supply the operating fluid to the brake system. The reservoir 30 may have an inlet provided at an upper part thereof such that the operating fluid can be additionally received from an external part. The reservoir 30 may include a first reservoir chamber 31 and a second reservoir chamber 32. The first reservoir chamber 31 may supply the operating fluid to the first hydraulic circuit. The second reservoir chamber 32 may supply the operating fluid to the second hydraulic circuit. In this case, a reservoir displacement sensor 150 may be used to detect a level of the operating fluid stored in the reservoir 30.

Two hydraulic circuits S1 and S2 may respectively include an analog-type normally-opened inlet valve V10 and an analog-type normally-closed outlet valve V20. The inlet valve V10 may be provided to a line for connecting the inlet port of the hydraulic pressure supply part 200 to each of four wheel brakes 20. The outlet valve V20 may be provided to a line for connecting the wheel brakes 20 to the outlet port of the hydraulic pressure supply part 200.

The inlet valve V10 may include first to fourth inlet valves V11, V12, V13, and V14. The first inlet valve V11 may be provided at a flow passage for connecting an outlet port 210b of the first hydraulic-pressure supply part 210 to a first wheel brake 21. The second inlet valve V12 may be provided at a flow passage for connecting the outlet port 210b of the first hydraulic-pressure supply part 210 to a third wheel brake 23. The third inlet valve V13 may be provided at a flow passage for connecting an outlet port 220b of the second hydraulic-pressure supply part 220 to a second wheel brake 22. The fourth inlet valve V14 may be provided at a flow passage for connecting the outlet port 220b of the second hydraulic-pressure supply part 220 to a fourth wheel brake 24.

The outlet valve V20 may include first to fourth outlet valves V21, V22, V23, and V24. The first outlet valve V21 may be provided at a flow passage for connecting an inlet port 210a of the first hydraulic-pressure supply part 210 to the first wheel brake 21. The second inlet valve V22 may be provided at a flow passage for connecting the inlet port 210a of the first hydraulic-pressure supply part 210 to the third wheel brake 23. The third inlet valve V23 may be provided at a flow passage for connecting an inlet port 220a of the second hydraulic-pressure supply part 220 to the second wheel brake 22. The fourth inlet valve V24 may be provided at a flow passage for connecting the inlet port 220a of the second hydraulic-pressure supply part 220 to the fourth wheel brake 24.

The pedal operation part 500 may include a first piston 531 connected to the pedal 10, a cylinder chamber 510, a volume of which is changed by the first piston 531, and a simulator chamber 520, a volume of which is changed by the second piston 532. The simulator unit 400 may be hydraulically connected to the simulator chamber 520 of the pedal operation part 500, thereby providing reaction force corresponding to a pedal effort of the pedal 10.

The cylinder chamber 510 may include a first cylinder chamber 511 connected to the first hydraulic circuit and a second cylinder chamber 512 connected to the second hydraulic circuit. The first cylinder chamber 511 and the second cylinder chamber 512 may be separated from each other by a third piston 533. In this case, the first piston 531 may move forward by a pedal effort of the pedal 10, and may move backward by a first elastic member 521. The third piston 533 may move forward by inner pressure of the second cylinder chamber 512, and may move backward by a second elastic member 542.

The first piston 531 may be connected to the pedal 10 through the input rod 11, and may receive forward force in the contraction direction of the cylinder chamber 510. The second piston 532 may receive forward force in the contraction direction of the simulator chamber 520 through the stopper projection 12 provided to the input rod 11, such that forward and backward movement of the first piston 531 and forward and backward movement of the second piston 532 may be performed independently of each other.

A first reservoir valve V41 may adjust pressure applied to the simulator chamber 520 by opening or closing a hydraulic line for interconnecting the simulator chamber 520 and the second reservoir chamber 32. In this case, a check valve 520a may be connected in parallel to the first reservoir valve V41, such that the check valve 520a may allow the operating fluid to flow from the second reservoir chamber 32 only to the simulator chamber 520. That is, the check valve 520a may act as a one-way valve.

Likewise, the second reservoir valve V42 may open or close a hydraulic line for interconnecting the second cylinder chamber 512 and the second reservoir chamber 32, thereby adjusting pressure operating in the second cylinder chamber 512. In this case, a check valve 512a may be connected in parallel to the first reservoir valve V42, such that the check valve 512a may allow the operating fluid to flow from the second reservoir chamber 32 only to the second cylinder chamber 512. That is, the check valve 512a may act as a one-way valve.

As described above, the simulator chamber 520 may be connected to the reservoir 30 through the first reservoir valve V41, and the cylinder chamber 510 may be connected to the reservoir 30 through the second reservoir valve V42. When testing the presence or absence of leakage of the air or the operating fluid in a fallback mode, the first reservoir valve V41 and the second reservoir valve V42 may be closed, and the first and second hydraulic-pressure supply parts 210 and 220 may generate hydraulic pressure.

Pedal displacement sensors 120a and 120b may detect a displacement of the pedal 10, and may transmit an electrical signal to an electronic control unit (ECU). The ECU may recognize braking pressure desired by the driver by analyzing signals of the pedal displacement sensors 120a and 120b, and may output an signal for controlling the hydraulic pressure supply part 200 and various valves so as to satisfy the driver's desired braking pressure.

Circuit hydraulic pressure sensors 130a and 130b may be provided to detect hydraulic pressure of the hydraulic circuit. For example, the circuit hydraulic pressure sensors 130a and 130b may include a first-circuit hydraulic pressure sensor 130a connected to the first hydraulic circuits so as to detect hydraulic pressure, and a second-circuit hydraulic pressure sensor connected to the second hydraulic circuit so as to detect hydraulic pressure. The circuit hydraulic pressure sensors 130a and 130b may be disposed between the hydraulic pressure supply part 200 and the inlet valve V10.

The hydraulic pressure supply part 200 may include the first hydraulic pressure supply part 210 and the second hydraulic pressure supply part 220. The first hydraulic pressure supply part 210 may include pump units 211 and 212 and a drive unit 213 for driving the pump units 211 and 212. The second hydraulic pressure supply part 220 may include pump units 221 and 222 and a drive unit 223 for driving the pump units 221 and 222. One hydraulic pressure supply part may include two pump units. For example, the first hydraulic pressure supply part 210 may include the drive unit 213 and the first and second pump units 211 and 212 driven by the drive unit 213. The second hydraulic pressure supply part 220 may include the drive unit 223 and the first and second pump units 221 and 222 driven by the drive unit 223. Each of the drive units 213 and 223 may be a brushless motor.

Although not shown in the drawings, the outlet port of the first hydraulic pressure supply part 210 may be connected to the outlet port of the second hydraulic pressure supply part 220 through a balance valve. As a result, pressure of the first hydraulic pressure supply part 210 and pressure of the second hydraulic pressure supply part 220 are adjusted so that hydraulic pressure operating in the first hydraulic circuit and hydraulic pressure operating in the second hydraulic circuit can be identical to each other.

An electric circuit may include a first electric circuit S1 having a first electronic control unit (ECU) E1 and a second electric circuit S2 having a second ECU E2. The first ECU S1 and the second ECU S2 may be electric circuits driven by only one power source P1.

The first electric circuit S1 may control generation of brake pressure of the first wheel brake 21 and generation of brake pressure of the third wheel brake 23. The second electric circuit S2 may control generation of brake pressure of the second wheel brake 22 and generation of brake pressure of the fourth wheel brake 24. In this case, a communication interface for implementing communication between the first electric circuit S1 and the second electric circuit S2 may be additionally used. The communication interface may electrically operate independently of the first and second circuits S1 and S2.

Meanwhile, the electric circuit may also operate a parking brake integrated with the electrically operated wheel brake. The wheel brake may be connected to the first electric circuit S1 and the second electric circuit S2 that operate independently of each other, and may be driven in an integrated parking brake (IPB) scheme in which the wheel brake and the parking brake are integrated into one body. The first electric circuit S1 may control the parking brake integrated with the fourth wheel brake 24, and the second electric circuit S2 may control the parking brake integrated with the third wheel brake 23. In this case, the third wheel brake 23 and the fourth wheel brake 24 may be one pair of rear wheels RR and RL.

The first hydraulic pressure supply part 210, the first hydraulic circuit, and the first ECU E1 may be integrated into a first module. The second hydraulic pressure supply part 220, the second hydraulic circuit, and the second ECU E2 may be integrated into a second module. Moreover, the first hydraulic pressure supply part 210, the second hydraulic pressure supply part 220, the first hydraulic circuit, and the second hydraulic circuit may also be integrated into one module as necessary. Here, each module may be a physical valve block.

A first control valve V31 may be embedded in the first hydraulic circuit, and may interconnect the inlet port 210a and the outlet port 210b of the first hydraulic pressure supply part 210, such that the first control valve V31 may adjust pressure in each of the inlet port and the outlet port of the first hydraulic pressure supply part 210. A second control valve V32 may be embedded in the second hydraulic circuit, and may interconnect the inlet port 210a and the outlet port 210b of the second hydraulic pressure supply part 220, such that the second control valve V32 may adjust pressure in each of the inlet port and the outlet port of the second hydraulic pressure supply part 220. Through adjustment of the opening or closing of the first control valve V31 and the second control valve V32, pressure generated before the hydraulic pressure supply part and pressure generated after the hydraulic pressure supply part may be adjusted.

The above-mentioned electronic brake system according to the embodiments of the present disclosure may reduce costs for maintaining fabrication lines, may simplify an assembly structure, may reduce the number of constituent elements, and may improve a coupling structure between the constituent elements, thereby obviating disadvantages of a conventional brake system that is costly to manufacture.

Figure 2:
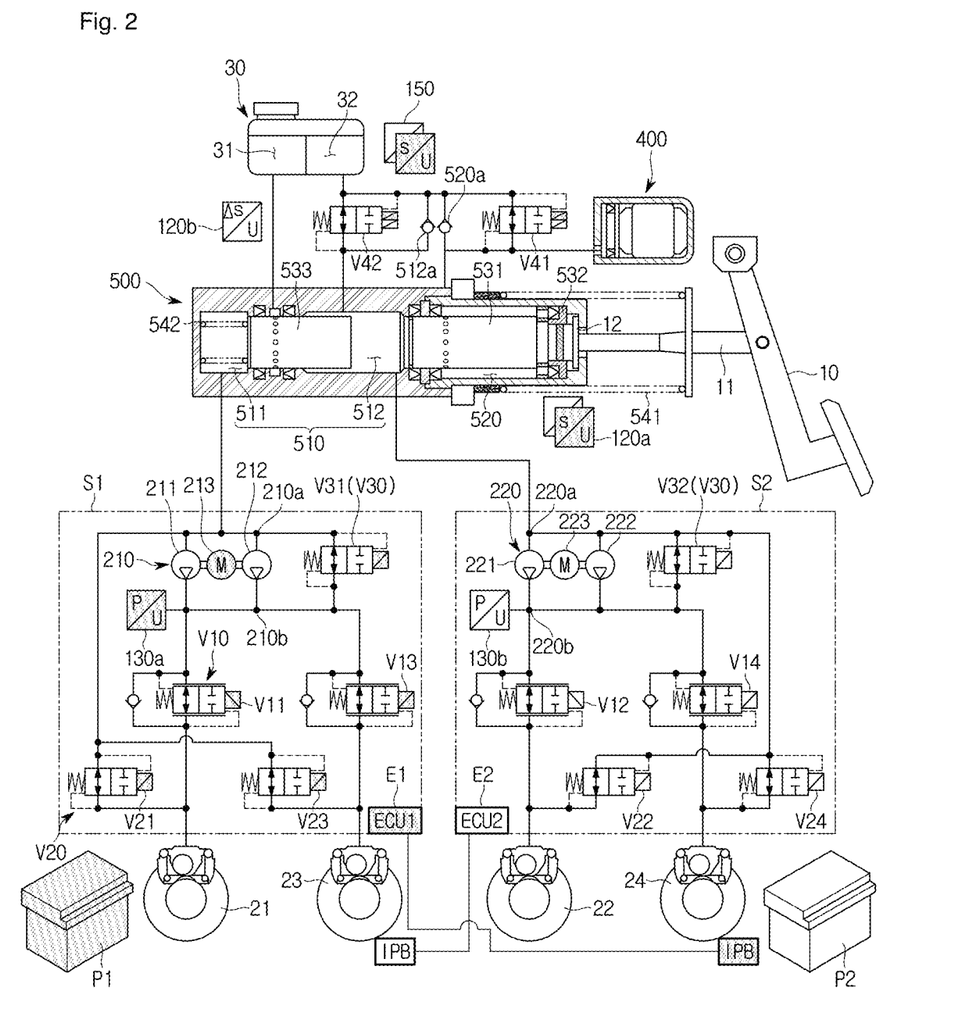
FIG. 2 is a view illustrating an electronic brake system according to a second embodiment of the present disclosure.

FIG. 2 is a view illustrating an electronic brake system according to a second embodiment of the present disclosure. Referring to FIG. 2, the first electric circuit S1 may receive power from a first power-supply source P1, and may control the first hydraulic pressure supply part 210 and the first hydraulic circuit, thereby adjusting brake pressure of the first wheel brake 21 and brake pressure of the third wheel brake 23. The second electric circuit S2 may receive power from a second power-supply source P2, and may control the second hydraulic pressure supply part 220 and the second hydraulic circuit, thereby adjusting brake pressure of the second wheel brake 22 and brake pressure of the fourth wheel brake 24.

The inlet or outlet valve provided in the first hydraulic circuit and the inlet or outlet valve provided in the second hydraulic circuit may be driven by different power supply sources. That is, the first hydraulic circuit may be driven by the first power supply source P1, and the second hydraulic circuit may be driven by the second power supply source P2. The first reservoir valve V31 and the second reservoir valve V42 may be simultaneously connected to the first power supply source P1 and the second power supply source P2. As a result, although any one of the power-supply sources is damaged or fails in operation, the first reservoir valve V41 and the second reservoir valve V42 can be driven by the remaining normal power-supply source.

A reservoir displacement sensor 150 may be provided with the reservoir 30. The reservoir displacement sensor 150 may include a main sensor connected to the first power-supply source P1 and an auxiliary sensor connected to the second power-supply source P2. In this case, the auxiliary sensor may be a redundancy sensor. Moreover, the pedal displacement sensors 120a and 120b may include the first pedal displacement sensor 120a connected to the first power-supply source P1 and the second pedal displacement sensor 120b connected to the second power-supply source P2.

Figure 3:
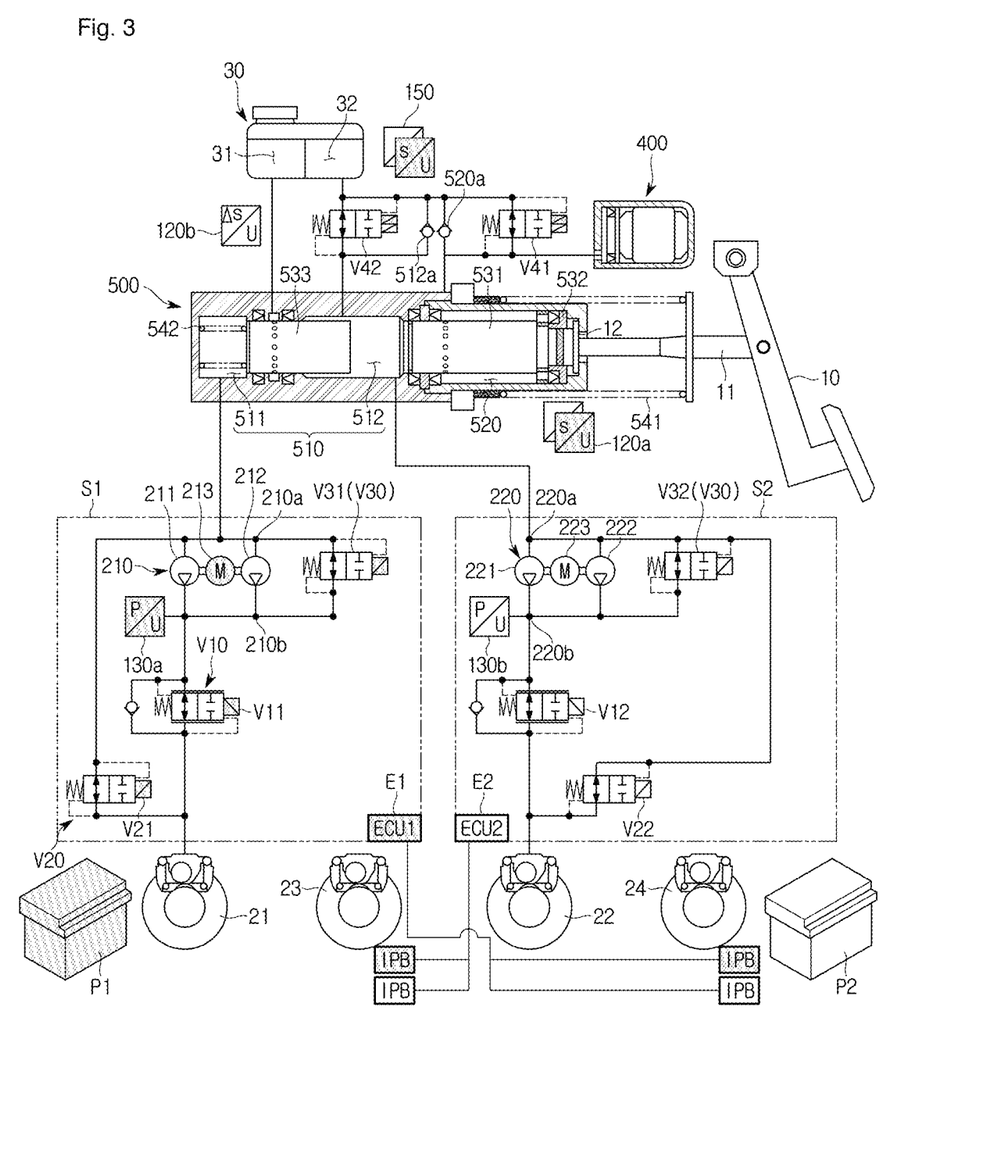
FIG. 3 is a view illustrating an electronic brake system according to a third embodiment of the present disclosure.

FIG. 3 is a view illustrating an electronic brake system according to a third embodiment of the present disclosure. Referring to FIG. 3, differently from the second embodiment, a flow passage structure for interconnecting the first hydraulic circuit and the third wheel brake 23 and a flow passage structure for interconnecting the second hydraulic circuit and the fourth wheel brake 24 are omitted from the electronic brake system of the third embodiment, such that the electronic brake system of the third embodiment can be simplified in structure as compared to the second embodiment.

Figure 4:
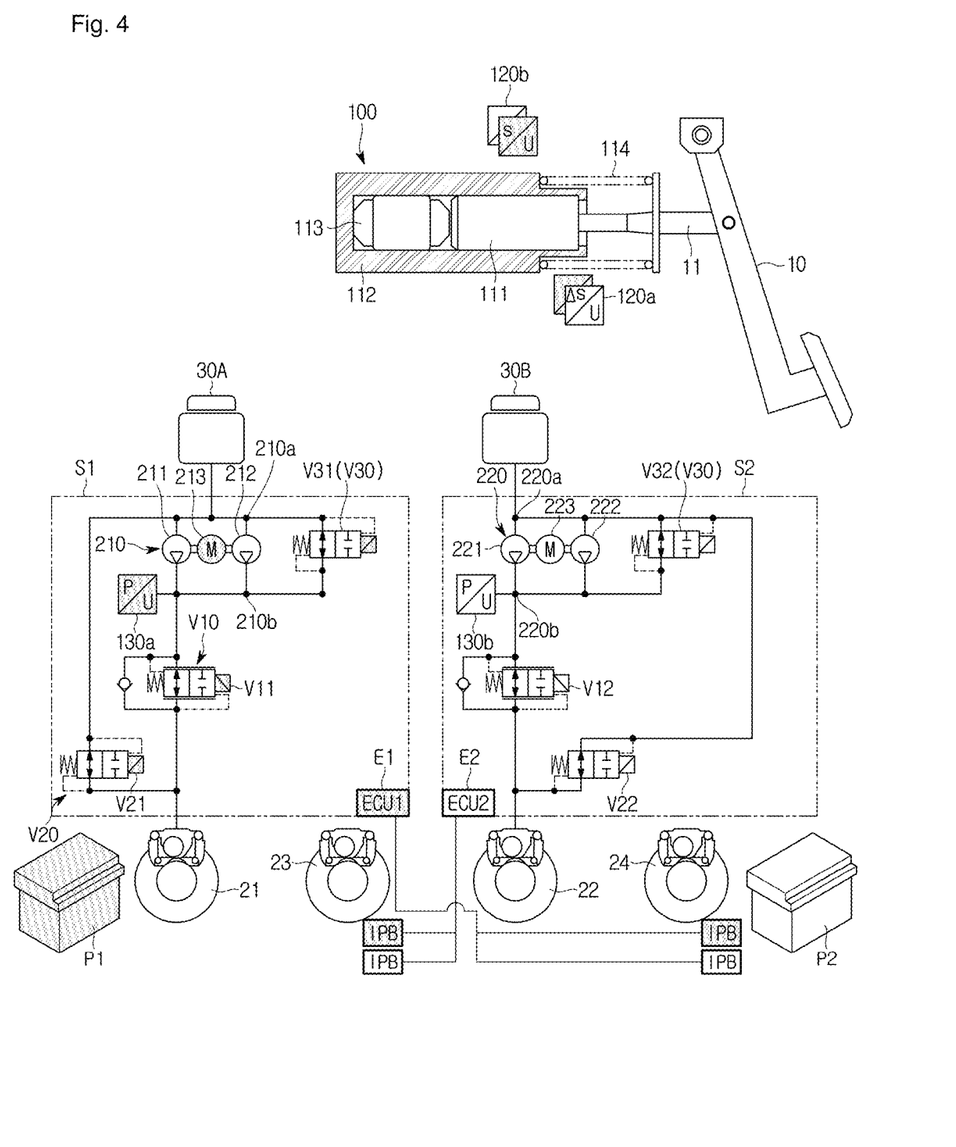
FIG. 4 is a view illustrating an electronic brake system according to a fourth embodiment of the present disclosure.

FIG. 4 is a view illustrating an electronic brake system according to a fourth embodiment of the present disclosure. Referring to FIG. 4, the pedal operation part 100 may include a piston 111, an elastic member 113, and pedal displacement sensors 120a and 120b. The piston 111 may be connected to the pedal 10 or a stick, and may be included in a housing 112. The elastic member 113 may provide reaction force corresponding to a pedal effort of the pedal. The pedal displacement sensors 120a and 120b may measure the driver's braking intention. In this case, the pedal operation part 100 may be integrated into one module composed of the first hydraulic circuit and the second hydraulic circuit. The pedal displacement sensors 120a and 120b may be directly integrated into the ECU.

The first reservoir chamber 31 provided to the first reservoir 30A may be connected to the inlet port 210a of the first hydraulic-pressure supply part 210. The second reservoir chamber 32 provided to the second reservoir 30B may be connected to the inlet port 220a of the second hydraulic-pressure supply part 220. The first reservoir chamber 31 may be installed in the first module, and the second reservoir chamber 32 may be installed in the second module.

The pedal operation part 100 may be connected to the pedal 10 through the input rod 11. One end of the input rod 11 may be connected to the pedal, such that the input rod 11 may perform rectilinear motion according to the displacement of the pedal 10. However, the input rod 11 may be connected to a specific point spaced apart from a rotation shaft of the pedal 10, resulting in occurrence of slight vertical movement of the input rod 11.

The pedal operation part 100 may provide reaction force corresponding to a pedal effort of the pedal 10 depressed by the driver. In contrast, the pedal operation part 100 may also provide reaction force corresponding to force for releasing the pedal effort of the pedal 10. In association with the pedal effort of the pedal depressed by the driver or force of releasing the pedal effort, the pedal operation part 100 compensates for the pedal effort or the releasing force and provides reaction force corresponding to the compensated force, such that braking force can be precisely adjusted as intended by the driver.

The pedal operation part 100 may include the piston 11 connected to the pedal 10, the housing 112 to form a space in which the piston 111 moves forward and backward, the elastic member 113 to provide reaction force corresponding to the pedal effort of the pedal 10, and a pedal spring 114 to provide elastic force by which the pedal 10 moves back to the initial position thereof. In this case, the elastic member 113 may be formed of rubber or the like. The elastic member 113 may be changed in shape according to various designs.

Meanwhile, the shape of the elastic member 113 shown in the drawings is merely an example of providing elastic force to the piston 111, the scope or spirit of the present disclosure is not limited thereto, and it should be noted that the elastic member 113 may also be implemented in other shapes capable of storing elastic force by shape modification. For example, the elastic member 113 may be a coil spring or a leaf spring.

The pedal spring 114 may be elastically deformed by forward movement of the pedal 10, and may be elastically restored by backward movement of the pedal 10, thereby providing restoring force to the pedal 10. The pedal spring 114 may provide restoring force to the pedal 10 such that the pedal 10 can move back to the original position thereof when the driver takes his or her foot off the pedal 10.

The pedal operation part 100 may be separated from the device for supplying brake pressure. For example, the brake pressure may be supplied only from the hydraulic pressure supply part 200 to be described later, and the pedal effort of the pedal 10 may be delivered only to the pedal operation part 100 and it is impossible to directly generate brake pressure.

Alternatively, the pedal 10 may include a pedal effort unit and a hydraulic pressure unit that are hydraulically separated from each other. The pedal effort unit may be coupled to the pedal operation part 100. The hydraulic pressure unit may be coupled from the hydraulic pressure supply part 200 generating hydraulic pressure to the wheel brake 20. In this case, hydraulic separation between the pedal effort unit and the hydraulic pressure unit may indicate that the pedal effort of the pedal 10 is not directly transmitted to the wheel brake 20 through the operating fluid.

Alternatively, the pedal effort unit and the hydraulic pressure unit may be mechanically separated from each other. In this case, mechanical separation may indicate that power transmission through mechanical elements disposed between the pedal effort unit and the hydraulic pressure unit is not associated with power transmission through hydraulic pressure. The pedal effort unit and the hydraulic pressure unit may be electrically connected to each other through the ECU and the pedal displacement sensors 120*a* and 120*b*.

However, it should be noted that mechanical separation between the pedal effort unit and the hydraulic pressure unit may not always include that the pedal effort unit and the hydraulic pressure unit are not integrated into one unit through mechanical coupling therebetween. That is, the pedal effort unit and the hydraulic pressure unit may be integrated into one unit so as to reduce weight and volume.

As is apparent from the above description, the electronic brake system according to the embodiments of the present disclosure may allow electronic stability control (ESC) to normally operate even when any one of electric circuits fails to operate in an automatic driving mode, such that the electronic brake system may be efficiently driven as a modularized brake system.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An electronic brake system comprising:
    a first hydraulic circuit associated with a first wheel brake and powered from a first power circuitry;
    a second hydraulic circuit associated with a second wheel brake and powered from a second power circuitry;
    a first hydraulic pressure sensor configured to detect a hydraulic pressure of the first hydraulic circuit and powered from the first power circuitry;
    a second hydraulic pressure sensor configured to detect a hydraulic pressure of the second hydraulic circuit and powered from the second power circuitry;
    a first parking brake associated with a third wheel brake, wherein the third wheel brake is not fluidly coupled to the first and second hydraulic circuits;
    a second parking brake associated with a fourth wheel brake, wherein the fourth wheel brake is not fluidly coupled to the first and second hydraulic circuits;
    a first pedal displacement sensor powered from the first power circuitry;
    a second pedal displacement sensor powered from the second power circuitry;
    first and second controllers electrically coupled to the first pedal displacement sensor and the second pedal displacement sensor,
    wherein the first controller is electrically coupled to the first hydraulic circuit associated with the first wheel brake, and electrically coupled to the second parking brake associated with the fourth wheel brake without being electrically coupled to the first parking brake associated with the third wheel brake; and
    the second controller is electrically coupled to the second hydraulic circuit associated with the second wheel brake, and electrically coupled to the first parking brake associated with the third wheel brake without being electrically coupled to the second parking brake associated with the fourth wheel brake.

2. The electronic brake system according to claim 1, wherein:
    the first controller is configured to control the first hydraulic circuit and the second parking brake without controlling the second hydraulic circuit and the first parking brake; and
    the second controller is configured to control the second hydraulic circuit and the first parking brake without controlling the first hydraulic circuit and the second parking brake.

3. The electronic brake system according to claim 1, wherein:
    the first controller is powered from the first power circuitry,
    the second controller is powered from the second power circuitry,
    the first hydraulic circuit is powered from the first power circuitry without being powered from the second power circuitry,
    the second hydraulic circuit is powered from the second power circuitry without being powered from the first power circuitry,
    the first parking brake is powered from the second power circuitry without being powered from the first power circuitry, and
    the second parking brake is powered from the first power circuitry without being powered from the second power circuitry.

4. The electronic brake system according to claim 1, further comprising:
    a third parking brake associated with the third wheel brake; and
    a fourth parking brake associated with the fourth wheel brake;
    wherein:
    the first controller, which is electrically coupled to the first hydraulic circuit associated with the first wheel brake, is electrically coupled to the fourth parking brake associated with the fourth wheel brake without being electrically coupled to the third parking brake associated with the third wheel brake, and
    the second controller, which is electrically coupled to the second hydraulic circuit associated with the second wheel brake, is electrically coupled to the third parking brake associated with the third wheel brake without being electrically coupled to the fourth parking brake associated with the fourth wheel brake.

5. The electronic brake system according to claim 4, wherein:
    the first controller is configured to control the first hydraulic circuit, the second parking brake and the fourth parking brake without controlling the second hydraulic circuit and the first parking brake and the third parking brake; and
    the second controller is configured to control the second hydraulic circuit and the first parking brake and the third parking brake without controlling the first hydraulic circuit, the second parking brake and the fourth parking brake.

6. The electronic brake system according to claim 4, wherein:
    the first controller is powered from the first power circuitry,
    the second controller is powered from to the second power circuitry, the first hydraulic circuit is powered from the first power circuitry without being powered from the second power circuitry, the second hydraulic circuit is powered from the second power circuitry without being powered from the first power circuitry, the first parking brake is powered from the first power circuitry without being powered from the second power circuitry, the second parking brake is powered from the first power circuitry without being powered from the second power circuitry, the third parking brake is powered from the second power circuitry without being powered from the first power circuitry, and the fourth parking brake is powered from the second power circuitry without being powered from the first power circuitry.

7. The electronic brake system according to claim 1, wherein:

the first hydraulic circuit comprises a first line hydraulically coupled to the first wheel brake and a plurality of first valves provided on the first line, and the second hydraulic circuit comprises a second line hydraulically coupled to the second wheel brake and a plurality of second valves provided on the second line.

8. The electronic brake system according to claim 7, wherein:

the first controller is configured to open or close the plurality of first valves, and the second controller is configured to open or close the plurality of second valves.

9. The electronic brake system according to claim 1, further comprising:

a communication interface between the first controller and the second controller.

10. The electronic brake system according to claim 1, wherein:

the first hydraulic pressure sensor is connected to a downflow of a first hydraulic-pressure supply part comprising a first pump, and the second hydraulic pressure sensor is connected to a downflow of a second hydraulic-pressure supply part comprising a second pump.

11. An electronic brake system comprising:

a first pedal displacement sensor powered from the first power circuitry;

a second pedal displacement sensor powered from the second power circuitry;

first and second controllers electrically coupled to the first pedal displacement sensor and the second pedal displacement sensor, the first controller powered from the first power circuitry and the second controller powered from the second power circuitry;

a first hydraulic circuit associated with a first wheel brake, the first hydraulic circuit electrically coupled to the first controller and powered from the first power circuitry without being powered from the second power circuitry;

a second hydraulic circuit associated with a second wheel brake, the second hydraulic circuit electrically coupled to the second controller and powered from the second power circuitry without being powered from the first power circuitry;

a first hydraulic pressure sensor configured to detect a hydraulic pressure of the first hydraulic circuit and powered from the first power circuitry without being powered from the second power circuitry;

a second hydraulic pressure sensor configured to detect a hydraulic pressure of the second hydraulic circuit and powered from the second power circuitry without being powered from the first power circuitry;

a first parking brake associated with a third wheel brake, the first parking brake electrically coupled to the second controller and powered from the second power circuitry without being powered from the first power circuitry, wherein the third wheel brake is not fluidly coupled to the first and second hydraulic circuits; and a second parking brake associated with a fourth wheel brake, the second parking brake electrically coupled to the first controller and powered from the first power circuitry without being powered from the second power circuitry, wherein the fourth wheel brake is not fluidly coupled to the first and second hydraulic circuits.

12. The electronic brake system according to claim 11, wherein:

the first controller is configured to control the first hydraulic circuit and the second parking brake without controlling the second hydraulic circuit and the first parking brake; and the second controller is configured to control the second hydraulic circuit and the first parking brake without controlling the first hydraulic circuit and the second parking brake.

13. The electronic brake system according to claim 11, wherein:

the first hydraulic circuit is electrically coupled to the first controller without being electrically coupled to the second controller, the second hydraulic circuit is electrically coupled to the second controller without being electrically coupled to the first controller, the first parking brake is electrically coupled to the second controller without being electrically coupled to the first controller, and the second parking brake is electrically coupled to the first controller without being electrically coupled to the second controller.

14. The electronic brake system according to claim 11, further comprising:

a third parking brake associated with the third wheel brake, the third parking brake electrically coupled to the second controller and powered from the first power circuitry without being powered from the second power circuitry; and a fourth parking brake associated with the fourth wheel brake, the fourth parking brake electrically coupled to the first controller and powered from the second power circuitry without being powered from the first power circuitry.

15. The electronic brake system according to claim 14, wherein:

the first controller is configured to control the first hydraulic circuit, the second parking brake and the fourth parking brake without controlling the second hydraulic circuit and the first parking brake and the third parking brake; and the second controller is configured to control the second hydraulic circuit and the first parking brake and the third parking brake without controlling the first hydraulic circuit, the second parking brake and the fourth parking brake.

16. The electronic brake system according to claim 14, wherein:
the third parking brake electrically coupled to the second controller without being electrically coupled to the first controller; and
the fourth parking brake electrically coupled to the first controller without being electrically coupled to the second controller.

17. The electronic brake system according to claim 11, wherein:
the first hydraulic circuit comprises a first line hydraulically coupled to the first wheel brake and a plurality of first valves provided on the first line, and
the second hydraulic circuit comprises a second line hydraulically coupled to the second wheel brake and a plurality of second valves provided on the second line.

18. The electronic brake system according to claim 17, wherein:
the first controller is configured to open or close the plurality of first valves, and
the second controller is configured to open or close the plurality of second valves.

19. The electronic brake system according to claim 11, further comprising:
a communication interface between the first controller and the second controller.

20. The electronic brake system according to claim 1, wherein:
the first hydraulic pressure sensor is connected between the first wheel brake and a first hydraulic-pressure supply part comprising a first pump, and
the second hydraulic pressure sensor is connected between the second wheel brake and a second hydraulic-pressure supply part comprising a second pump.

* * * * *